(12) United States Patent
Mendiratta et al.

(10) Patent No.: US 9,590,861 B2
(45) Date of Patent: Mar. 7, 2017

(54) COMMUNICATION ENDPOINT CALL LOG NOTIFICATION

(71) Applicant: Avaya Inc., Santa Clara, CA (US)

(72) Inventors: Harsh V. Mendiratta, East Brunswick, NJ (US); Tibor Lukac, Superior, CO (US); Puneet Kumar, Pune (IN); Srinivasan Narayanan, Pune (IN)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/727,565

(22) Filed: Jun. 1, 2015

(65) Prior Publication Data
US 2016/0269521 A1 Sep. 15, 2016

Related U.S. Application Data

(60) Provisional application No. 62/130,408, filed on Mar. 9, 2015.

(51) Int. Cl.
| H04M 1/56 | (2006.01) |
|---|---|
| H04M 15/06 | (2006.01) |
| H04M 3/42 | (2006.01) |
| H04L 12/24 | (2006.01) |
| H04L 29/06 | (2006.01) |

(52) U.S. Cl.
CPC ............ H04L 41/18 (2013.01); H04L 63/083 (2013.01); H04L 63/10 (2013.01); H04M 3/42042 (2013.01); H04M 3/42212 (2013.01); H04M 2250/60 (2013.01)

(58) Field of Classification Search
CPC .. H04M 15/06; H04M 1/2477; H04M 1/2535; H04M 1/72566; H04M 2203/4509; H04M 3/2218; H04M 3/46; H04M 3/58

USPC .......... 379/142.01, 142.16, 142.07
See application file for complete search history.

(56) References Cited

U.S. PATENT DOCUMENTS

| 6,885,739 B2* | 4/2005 | Cannon ................ H04M 1/57 379/142.01 |
| 7,315,614 B2* | 1/2008 | Bedingfield, Sr. ... H04M 7/0039 379/142.01 |
| 7,493,110 B2 | 2/2009 | Jiang |

(Continued)

OTHER PUBLICATIONS

"Apple Push Notification Service," Apple, 2015, retrieved from https://developer.apple.com/library/ios/documentation/NetworkingInternet/Conceptual/RemoteNotificationsPG/Chapters/ApplePushService.html, 7 pages.

(Continued)

Primary Examiner — Quoc D Tran
(74) Attorney, Agent, or Firm — Sheridan Ross P.C.

(57) ABSTRACT

A communication processor receives a call request to establish a communication session from a first communication endpoint to a second communication endpoint. The communication processor changes the intent of the call request. For example, the call request can be changed by automatically forwarding the call request, automatically forking the call request, automatically rejecting the call request based on the second communication endpoint being busy, and/or changing a first type of medium of the communication session to a second type of medium of the communication session. A call log manager conveys status information regarding the changed intent of the call to a call log of the second communication endpoint based on changing the intent of the call request.

20 Claims, 5 Drawing Sheets

| | CALL LOG – SHELLY BLACK'S PHONE | | |
|---|---|---|---|
| | TIME | CALLER | STATUS |
| 210A | 7:01 AM 3/12/15 | JACK HAMMER | AUTO FORWARDED TO JANE DOE – ANSWERED BY JANE DOE AT 123-456-7890 |
| 210B | 9:00 AM 3/12/15 | SALLY WHITE | AUTO FORWARDED TO JANE DOE – FORWARDED TO JANE DOE'S VOICEMAIL |
| 210C | 11:01 AM 3/12/15 | FRED HAYES | FORKED TO LAB – ANSWERED BY BILL WHITE AT 123-456-7891 |
| 210D | 11:30 AM 3/12/15 | ALVIN HAYES | FORKED TO LAB – TRANSFERRED FROM LAB TO JANE DOE AT 123-456-7890 |
| 210E | 11:44 AM 3/12/15 | WILMA JONES | MISSED VIDEO CALL – LINE BUSY |
| 210F | 1:03 PM 3/12/15 | SALLY WHITE | MISSED CALL – LINE BUSY – ON CALL WITH FRED HAYES – JIM BOB ON HOLD |
| 210G | 1:07 PM 3/12/15 | BRENT JONES | MISSED CALL – LINE BUSY – FORWARDED TO JANE DOE AT 123-456-7890 |
| 210H | 1:10 AM 3/12/15 | FRED HAYES | ANSWERED – INITIAL CALL VIDEO HIGH RES – ACTUAL VOICE CALL |
| 210I | 4:00 AM 3/12/15 | JOHN SMITH | AUTO FORWARD TO VOICEMAIL |
| 210N | 5:22 AM 3/12/15 | BILL GREEN | MISSED CALL – ANSWERED BY JIM BOB AT SHELLY BLACK'S PHONE |

(56) References Cited

U.S. PATENT DOCUMENTS

| | | | | |
|---|---|---|---|---|
| 8,204,192 B1* | 6/2012 | Suhail | ................. | H04M 1/2477 |
| | | | | 379/142.06 |
| 2006/0067498 A1* | 3/2006 | Plas | ....................... | H04L 12/66 |
| | | | | 379/201.01 |
| 2011/0293084 A1* | 12/2011 | Bhagavatula | ....... | H04L 41/5067 |
| | | | | 379/211.02 |
| 2015/0222744 A1* | 8/2015 | Azim | ................. | H04M 3/2218 |
| | | | | 379/140 |

OTHER PUBLICATIONS

"Avaya Aura® Application Server 5300," Avaya Inc., 2016, retrieved from http://www.avaya.com/usa/product/avaya-aura-application-server-5300/#, 9 pages.

* cited by examiner

CALL LOG – SHELLY BLACK'S PHONE — 200

| TIME | CALLER | STATUS |
|---|---|---|
| 210A  7:01 AM 3/12/15 | JACK HAMMER | AUTO FORWARDED TO JANE DOE – ANSWERED BY JANE DOE AT 123-456-7890 |
| 210B  9:00 AM 3/12/15 | SALLY WHITE | AUTO FORWARDED TO JANE DOE – FORWARDED TO JANE DOE'S VOICEMAIL |
| 210C  11:01 AM 3/12/15 | FRED HAYES | FORKED TO LAB – ANSWERED BY BILL WHITE AT 123-456-7891 |
| 210D  11:30 AM 3/12/15 | ALVIN HAYES | FORKED TO LAB – TRANSFERRED FROM LAB TO JANE DOE AT 123-456-7890 |
| 210E  11:44 AM 3/12/15 | WILMA JONES | MISSED VIDEO CALL – LINE BUSY |
| 210F  1:03 PM 3/12/15 | SALLY WHITE | MISSED CALL – LINE BUSY – ON CALL WITH FRED HAYES – JIM BOB ON HOLD |
| 210G  1:07 PM 3/12/15 | BRENT JONES | MISSED CALL – LINE BUSY – FORWARDED TO JANE DOE AT 123-456-7890 |
| 210H  1:10 AM 3/12/15 | FRED HAYES | ANSWERED – INITIAL CALL VIDEO HIGH RES – ACTUAL VOICE CALL |
| 210I  4:00 AM 3/12/15 | JOHN SMITH | AUTO FORWARD TO VOICEMAIL |
| 210N  5:22 AM 3/12/15 | BILL GREEN | MISSED CALL – ANSWERED BY JIM BOB AT SHELLY BLACK'S PHONE |

FIG. 2

COMMUNICATION ENDPOINT CALL LOG NOTIFICATION

CROSS REFERENCE TO RELATED APPLICATIONS

This application claims the benefit under 35 U.S.C. §119 (e) of U.S. Provisional Application No. 62/130,408, filed Mar. 9, 2015, entitled "OAuth2 Reference Architecture," the entire disclosure of which is incorporated herein by reference.

TECHNICAL FIELD

The systems and methods disclosed herein relate to communication systems and in particular to tracking call progress in a communication system.

BACKGROUND

Typically, when a call is missed by a communication endpoint, the call log of the communication endpoint does not reflect the missed call. One exception is where a mobile device is powered down or out of the network when a call is received. In this case, the call log of the mobile device is updated when the mobile device powers up or joins the network. However, there are a number of other scenarios in which information regarding incoming calls is not delivered to the called user's call log. For example, when a user has placed their telephone to automatically forward all calls, the user is not notified of any of the calls that are forwarded in the user's call log. For other features like send all calls, call forward on busy, and call forward because of unavailability of call appearance, the calls are forwarded to other destinations without giving any indication in the called user's call log; thereby, keeping the called user unaware of the missed calls that were not sent to the called user's communication endpoint.

In other cases, when a call is forked, the call may be forked to another communication endpoint and answered on the other communication endpoint. In this case, the call log on the user's communication endpoint does not reflect the status of the forked call. Even if the call is answered, the call log may not properly reflect the status of the call. For example, if the call is answered by another party, the called party may be unaware of the missed call unless the other party tells the called party of the missed call.

At times, the call log does not properly reflect opportunities for better collaboration. For example, if the calling party intended to establish a video call and the call was changed to a voice only call, the call log does not properly reflect the missed opportunity for better collaboration.

SUMMARY

Systems and methods are provided to solve these and other problems and disadvantages of the prior art. A communication processor receives a call request to establish a communication session from a first communication endpoint to a second communication endpoint. The communication processor changes the intent of the call request. For example, the call request can be changed by automatically forwarding the call request, automatically forking the call request, automatically rejecting the call request based on the second communication endpoint being busy, and/or changing a first type of medium of the communication session to a second type of medium of the communication session. A call log manager conveys status information regarding the changed intent of the call to a call log of the second communication endpoint based on changing the intent of the call request.

In a second embodiment, a signal that a communication session has been established to a communication endpoint of a called party is received. A determination is made that the called party of the communication endpoint is not involved in the communication session. For example, if the call was answered by a different person. In response to determining that the called party was not involved in the communication session, a call log is displayed on the communication endpoint that indicates that the communication session was missed by the called party.

BRIEF DESCRIPTION OF THE DRAWINGS

FIG. 2 is an exemplary display of a call log.

DETAILED DESCRIPTION

Figure 1:
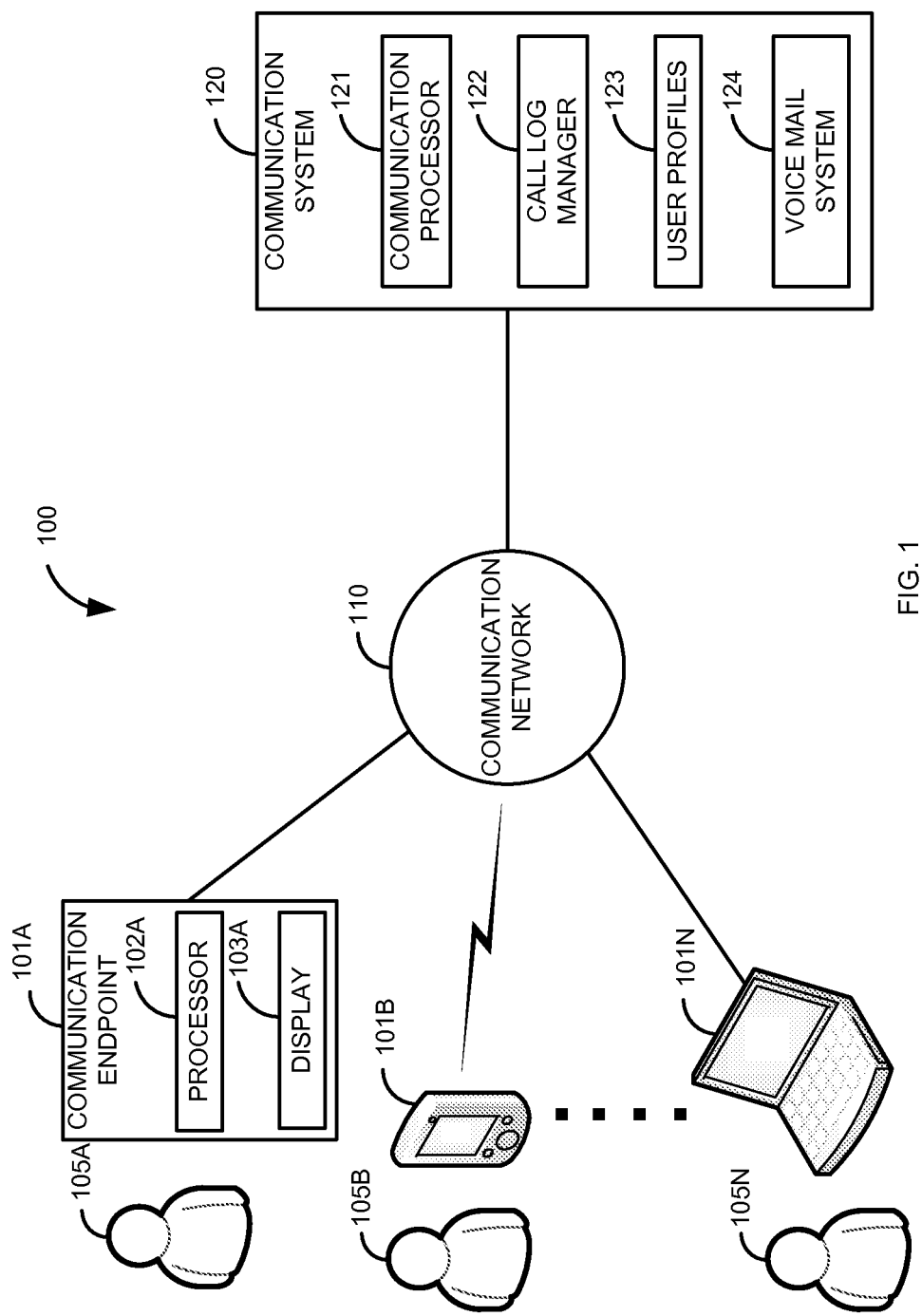
FIG. 1 is a block diagram of a first illustrative system for communication endpoint call log notification.

FIG. 1 is a block diagram of a first illustrative system 100 for communication endpoint call log notification. The first illustrative system 100 comprises communication endpoints 101A-101N, a communication network 110, and a communication system 120.

The communication endpoint 101 can be or may include any device that can communicate on the communication network 110, such as a Personal Computer (PC), a telephone, a video system, a cellular telephone, a Personal Digital Assistant (PDA), a tablet device, a notebook device, and/or the like. As shown in FIG. 1, any number of communication endpoints 101A-101N may be connected to the communication network 110. In addition, the communication endpoint 101 may be directly connected to the communication system 120.

The communication endpoint 101A further comprises a processor 102A and a display 103A. The processor 102A can be or may include any type of processor, such as a microprocessor, a digital signaling processor, an application specific processor, and/or the like. The display 103A can be or may include any type of hardware that can provide an electronic display, such as a liquid crystal display, a plasma display, a cathode ray tube, a light emitting diode (LED) display, and/or the like. Although not shown, the communication endpoints 101B-101N will also include the processor 102 and the display 103.

In addition, FIG. 1 shows an associated user 105A-105N for each of the communication endpoints 101A-101N. Although only a single user 105 is shown for each communication endpoint, multiple users 105 may be associated with an individual communication endpoint 101. When a communication session is established, the user 105 is a party to the communication session.

The communication network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a video network, a combination of these, and the like. The communication network 110 can use a variety of electronic protocols, such as Ethernet, Internet Protocol (IP), Session Initiation Protocol (SIP), Integrated Services Digital Network (ISDN), video protocols, Instant Messaging (IM) protocols, and/or the like. Thus, the communication network 110 is an electronic communication network configured to carry electronic messages via packets and/or circuit switched communications.

The communication system 120 can be or may include any hardware in combination with software that that can route communications on the communication network 110. For example, the communication system 120 may be a Private Branch Exchange (PBX), a central office switch, a router, a session manager, a communication switch, a proxy server, and/or the like.

The communication system 120 further comprises a communication processor 121, a call log manager 122, user profiles 123, and a voicemail system 124. The communication processor 121 can be or may include any hardware processor in combination with software that can manage communication sessions. For example, the communication processor 121 can manage voice communications, video communications, Instant Messaging communications, text communications, and/or the like.

The call log manager 122 can be or may include any hardware/software that can manage call logs. For example, the call manager 122 can manage call logs for the communication endpoints 101A-101N.

The user profiles 123 are profiles that contain information on how to manage calls within the communication system 120. For example, the user profiles 123 may contain information on when to forward calls, when to fork calls, how to handle missed calls, how to handle answered calls, and/or the like. The user profiles 123 may be configured dynamically and/or based on rules. For example, the user 105 or an administrator may define the rules in the user profiles 123.

The voicemail system 124 can be or may include any hardware/software that can process voicemails. The voicemail system 124 can process voicemails for any number of users 105A-105N.

FIG. 2 is an exemplary display of a call log 200. The call log 200 is shown in a display 103A of the communication endpoint 101A, which is Shelly Black's communication endpoint 101A (e.g., a telephone). Although not shown, each of the communication endpoints 101B-101N may have similar call logs 200 for their respective users 105B-105N. The call log 200 contains a list of calls that were initially to be received at Shelly Black's communication endpoint 101. The call log 200 includes ten call entries 210A-210N. The call log 200 may include any number of call entries 210A-210N. A call entry 210 is for an individual call. A call entry 210 can be for different types of calls, such as voice calls, video calls, Instant Messaging (IM) calls, conference calls, and/or the like.

The call entry 210A is for a voice call from Jack Hammer. In this example, the user 105A, Shelly Black has set her phone to automatically forward all calls to her assistant Jane Doe at telephone number 123-456-7890. For example, Shelly Black may have defined an event in her user profile 123 that when she is in a meeting defined in her calendar that all calls are to be automatically forwarded to Jane Doe. When the voice call from Jack Hammer is received, the call is automatically forwarded by the communication system 120 to Jane Doe. In this example, Jane Doe answered the voice call from Jack Hammer. The information about the forwarded call is sent to the communication endpoint 101A for display in the call entry 210A.

The call entry 210B is for a voice call from Sally White. When this call is received, the user 105A, Shelly Black still has her telephone 101A set to automatically forward all calls to her assistant Jane Doe. However, in this example, Jane Doe did not answer the call and the call was forwarded (directed) to Jane Doe's voicemail system 124. The information about the automatically forwarded call is sent to the communication endpoint 101A for display in the call entry 210B.

A call may be forwarded based on various criteria. For example, a call may be forwarded based on a specific user, based on Shelly Black being on a call with a specific user, based on a specific time, based on a calendar event, and/or the like.

The call entry 210C is for a voice call from Fred Hayes. In this example, the user 105A, Shelly Black had configured her user profile 123 to fork call calls both to her main phone and a lab phone where she will be working. The call is forked to the lab phone and answered by Bill White at the lab phone (123-456-7891). The system can recognize that Bill White answered the call based on different criteria, such as voice recognition, facial recognition, Radio Frequency Identification (RFID), authentication, and/or the like. The information about the forked call is sent to the communication endpoint 101A for display in the call entry 210C.

The call entry 210D is for a voice call from Alvin Hayes that is also forked to the lab phone. In this example, after being forked to the lab phone, the call from Alvin Hayes is transferred to Jane Doe at 123-456-7890. The information about the forked call is sent to the communication endpoint 101A for display in the call entry 210D.

The examples for call entries 210C-210D are for situations where parallel forking used. Parallel forking is where a call is forked in parallel to two or more devices at the same time. In addition, the first illustrative system 100 can be used for sequential forking. Sequential forking is where a call is forked to a second device after a time period or event. For example, if the user 105, Shelly Black does not answer the call within 5 seconds, the call will be sequentially forked to Shelly Black's assistant Jane Doe.

The call entry 210E is for a video call from Wilma Jones. In this example, the line is busy. For example, the user 105A, Shelly Black is on another video call. Even though the video call from Wilma Jones was missed, the information about the missed video call is sent to the communication endpoint 101A for display in the call entry 210E.

The call entry 210F is for a voice call from Sally White. In this example, the line is busy. The line is busy because Shelly Black is on a call with Fred Hayes and because Shelly Black has Jim Bob on hold. The information about the missed call is sent to the communication endpoint 101A for display in the call entry 210F.

In this example, Shelly Black's phone 101A only has two call appearances that can be provided by the communication endpoint 101A. A call appearance is how many incoming calls can be handled by a communication endpoint 101 concurrently. In some embodiments, the number of active call appearances may be defined and/or limited by the communication system 120 based on a feature called Limit Number of Concurrent Calls (LNCC). This feature is administered on the communication system 120 to define how many concurrent calls can be handled by an individual communication endpoint 101. If all the call appearances have calls, the call normally would be a missed call.

The call entry 210G is for a voice call from Brent Jones. In this example, the line is busy. Shelly's Black's user profile 123 defines that all calls are forwarded to Jane Doe when Shelly Black's line (or all call appearances) is busy. When the call from Brent Jones is received, the call is automatically forwarded to Jane Doe because the line is busy. The information about the missed call is sent to the communication endpoint 101A for display in the call entry 210G.

The call entry 210H is for a video call from Fred Hayes. In this example, the initial call request from Fred Hayes is for a video call in high video resolution. However, due to an event, the call was converted to a voice call. The information about the high resolution video call that was changed to a voice call is sent to the communication endpoint 101A for display in the call entry 210H. This is an example of a missed opportunity for enhanced collaboration.

For example, the event of why the call was converted may be because Shelly Black has another person in her office at the time of the call from Fred Hayes. Shelly Black may not want Fred Hayes to know that the other person is in her office. However, by noting that Fred Hayes has tried to initiate a high resolution video call, Shelly Black can use this information when calling Fred Hayes in the future. Other events may be based on a bandwidth limitation or network congestion that can cause a change of media. The event may cause a video resolution to change, a media to change (e.g., voice to IM), a voice codec to change (lower audio resolution), and/or the like.

The call entry 210I is for a voice call from John Smith. In this example, the user 105A, Shelly Black has configured the communication system 120 to automatically forward all calls to her voicemail system 124. When the call is received from John Smith, the communication system 120 automatically forwards the call to Shelly Black's voicemail system 124. The information about the call being forwarded to Shelly Black's voicemail system 124 is sent to the communication endpoint 101A for display in the call entry 210I.

The call entry 210N is for a voice call from Bill Green. In this example, the voice call is answered at Shelly Black's communication endpoint 101A. However, a different user 105, Jim Bob answered the call. The process can detect that Jim Bob answered the voice call based on voice recognition, facial recognition, RFID, authentication, and/or the like. The information about the answered call is then sent to the communication endpoint 101A for display in the call entry 210N. In this example, the call is listed as missed in the call entry 210N because the user answering and talking during the call (Jim Bob) is not Shelly Black.

In another embodiment (not shown in FIG. 2), the call may not be sent to the communication endpoint 101 based on other factors, such as a user setting their phone to a "do not disturb" mode (a user event). The call may not be sent to the communication endpoint 101 based on a calendar event where the user says they are out of the office or out to lunch (another user event). The events may be based on other factors not related to a user, such as Network Call Redirection NCR (a network or administered event). In these embodiments, the call may never be received at the communication endpoint 101, so the communication endpoint 101 will only have a call entry if the call log manager 122 sends the call entry 210 to the communication endpoint 101.

The above descriptions of handling calls describe various kinds of call handling methods. One of skill in the art would recognize that different combinations of the above calls may be envisioned. For example, an Instant Messaging call may be forwarded or forked to different communication endpoint 101. The video/voice call of call entry 210H may be transferred to a third user 105. A forked call may be forwarded to a voicemail system 124.

The timing of when the call log 200 is updated may be handled in various ways. In one embodiment, a call entry 210 is updated when the call is finally completed. For example, the call entry 210B may be updated when Sally White has finished leaving a voicemail in Jane Doe's voicemail system 124.

In another embodiment, the call entry 210 is updated as the call progresses. For example, the call entry 210D may initially only indicate that the call was forked the lab. When the call is transferred from the lab to Jane Doe, the call entry 210D is updated a second time. When the call ends, the call entry 210D may be updated a third time to indicate that the call has ended and a time when the call ended. In one embodiment, a time for each leg of the call is displayed in the call entry 210D. Updating the call entry 210 as a call progresses may be accomplished for any kind of call.

In another embodiment, the user may be logged out of the communication endpoint 101 at the time of the call. In this example, the call entry 210 would be delivered to the communication endpoint 101 when the user logs back into the communication endpoint 101.

In FIG. 2, the call log shows phone numbers of some of the communication endpoints 101. However, a phone number/address, name, or other information of any communication endpoint 101, communication device, (e.g., voicemail system 124 or an Interactive Voice Response (IVR) system), and/or user(s) 105 involved in the communication session may be displayed. In addition, other information, such as email addresses, IM addresses, may also be displayed to allow a user 105 to establish a communication session via email or IM by clicking on the email address or IM address in the call entry 210. Addresses of additional communication endpoints 101 may also be included. For example, a cell phone number of Jim Bob may be included in the call entry 210N so that Shelly Black can call Jim Bob on his cell phone by clicking on Jim Bob's phone number in the call entry 210N.

Figure 3:
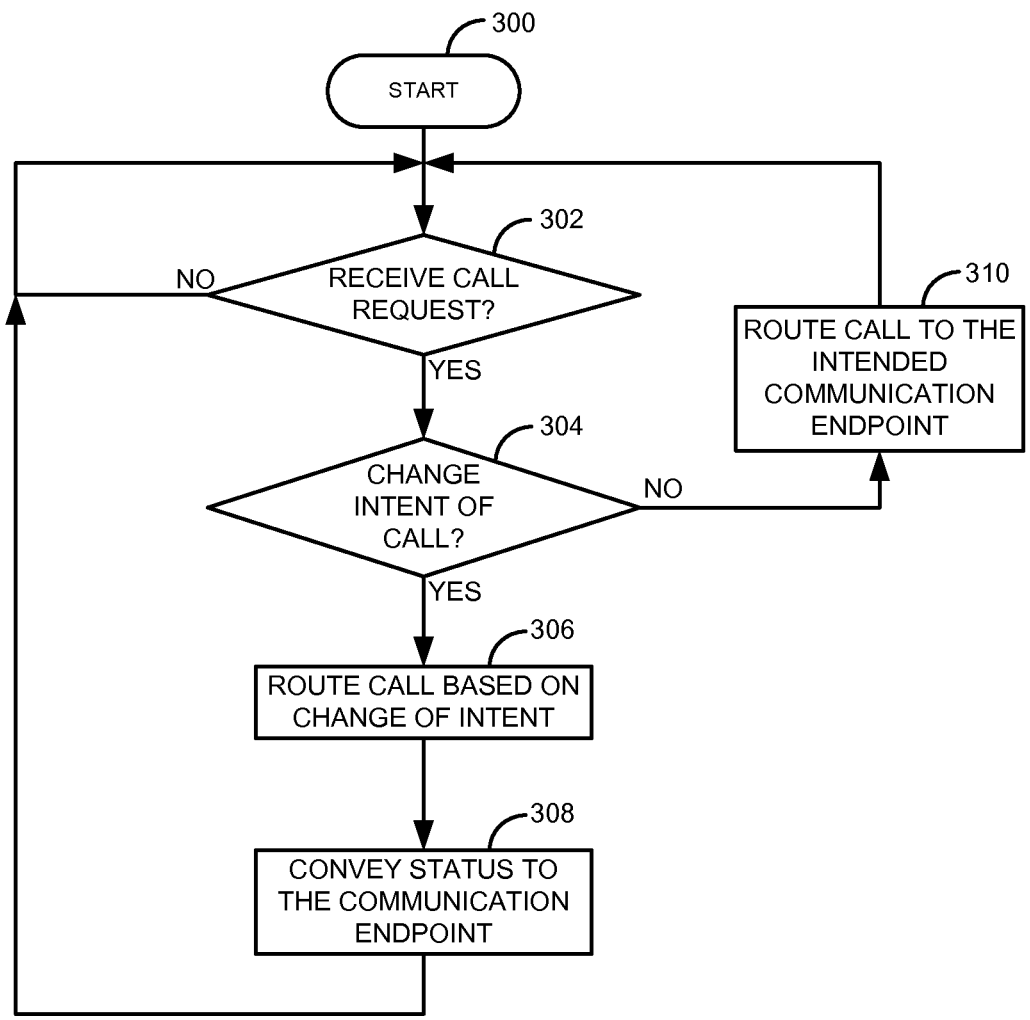
FIG. 3 is a flow diagram of a process for conveying status information to a call log.
Figure 4:
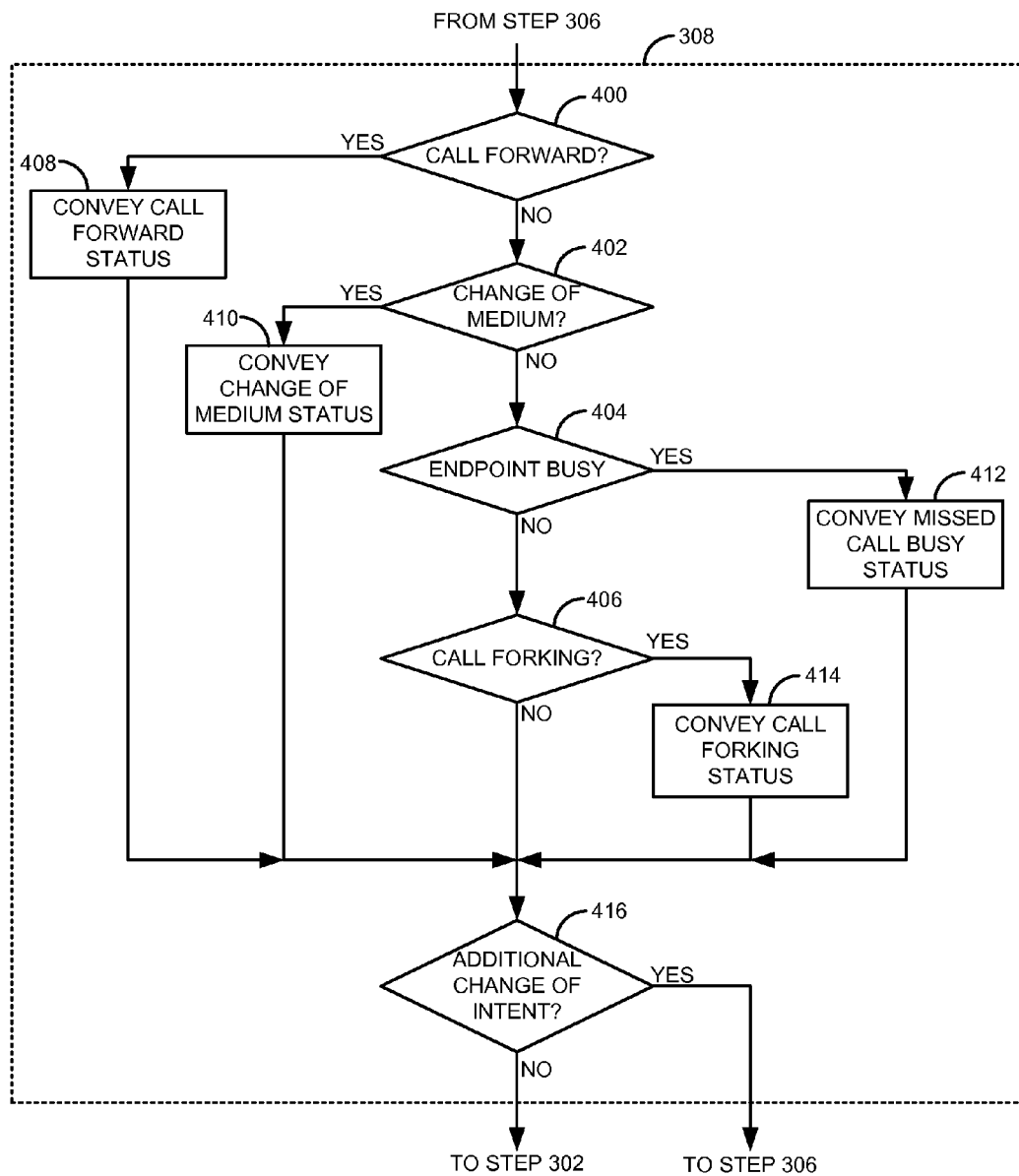
FIG. 4 is a flow diagram of a process for conveying status to a call log for different types of communication events.
Figure 5:
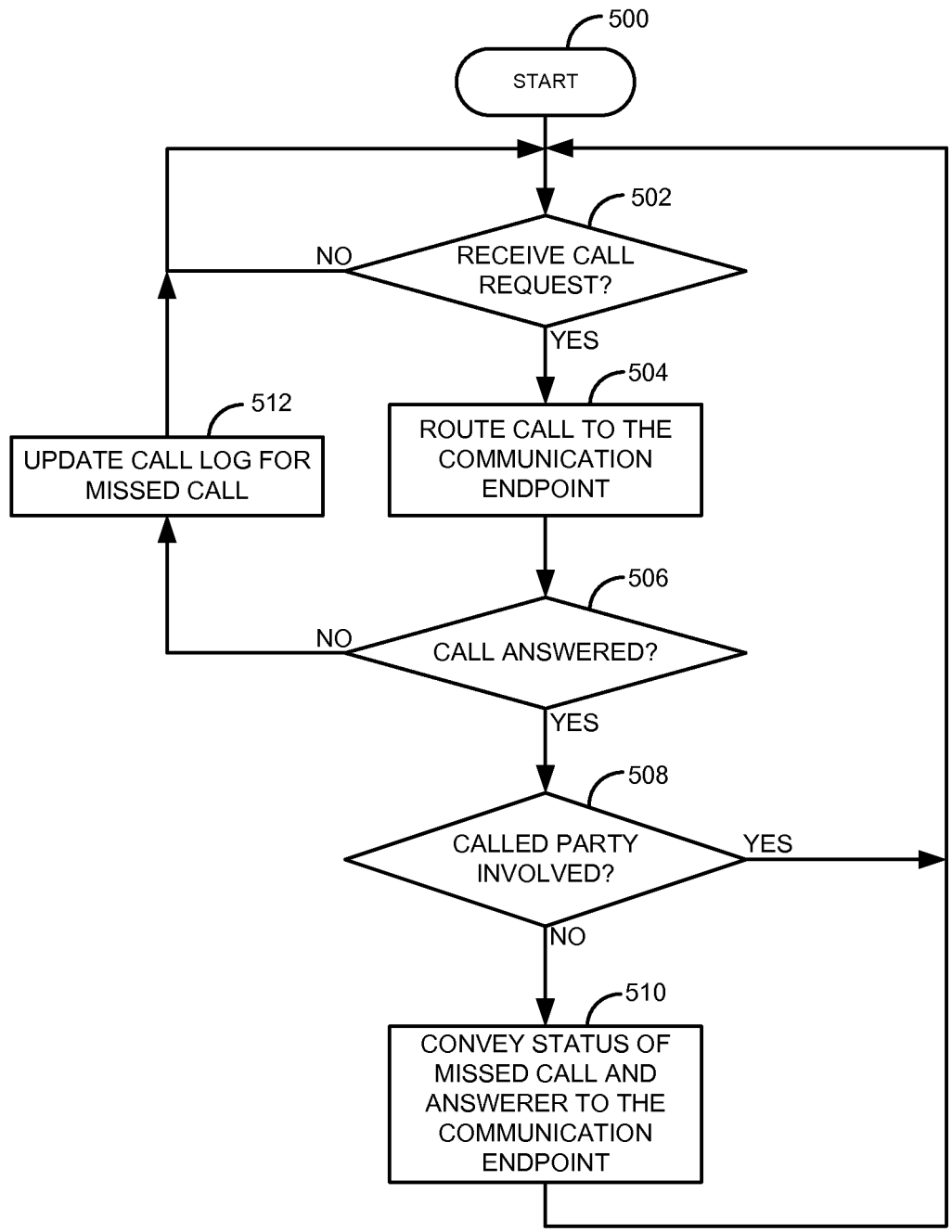
FIG. 5 is a flow diagram of a process for conveying status to a call log when a called party is not involved in a communication session.

FIG. 3 is a flow diagram of a process for conveying status information to a call log 200. Illustratively, the communication endpoints 101A-101N, the communication system 120, the communication processor 121, the call log manager 122, and the voicemail system 124 are stored-program-controlled entities, such as a computer or processor, which performs the method of FIGS. 3-5 and the processes described herein by executing program instructions stored in a non-transitory computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The process starts in step 300. The communication processor 121 determines if a call request to establish a communication session has been received in step 302. For example, if a voice call request has been received from the communication endpoint 101B to the communication endpoint 101A. If a call request to establish a communication session has not been received in step 302, the process repeats step 302.

Otherwise, if a call request to establish a communication session has been received in step 302, the communication processor 121 determines, in step 304, if there is a change of intent for the call. A change of intent is where the original intent of the call is changed in some manner, such as described in FIG. 2 when describing the call entries 210A-210N. If there was not a change of intent in step 304, the call processor 121 routes the call to the intended communication endpoint 101 in step 310.

Otherwise, if the intent of the call has changed in step 304, the call processor 121 routes the call based on the change of intent in step 306. For example, by call forwarding, call forking, responding that the endpoint is busy, changing a media, and/or the like. The call log manager 122 conveys status information regarding the call to the communication endpoint 101 of the initial call request in step 308. For example, as described previously in FIG. 2. The process goes back to step 302 to wait for a new call request. In one embodiment, the status information is archived so that the status information can be analyzed using data mining for behavior analysis.

FIG. 4 is a flow diagram of a process for conveying status to a call log 200 for different types of communication events. The process of FIG. 4 is an exemplary embodiment of step 308 of FIG. 3. After routing the call based on the change of intent in step 306, the call log manager 122 determines if the call was automatically forwarded in step 400. If the call was automatically forwarded in step 400, the call log manager 122 conveys the call forward status to the communication endpoint 101 of the initial call request in step 408. The process then goes to step 416.

Otherwise, if the call was not automatically forwarded in step 400, the call log manager 122 determines if the medium of the call has changed in step 402. If the medium of the call has changed in step 402, the call log manager 122 coveys the change of the medium status to the communication endpoint 101 of the initial call request in step 410. The change of medium may occur at the initiation of a call or at a later point in a call. For example, a call may change from video to voice part way through the call for various reasons. The process then goes to step 416.

If the medium of the call has not changed in step 402, the call log manager 122 determines if the communication endpoint 101 is busy (or all of the call appearances are busy) in step 404. If the communication endpoint 101 is busy in step 404, the call log manager 122 conveys that the communication endpoint 101 is busy in step 412. The process then goes to step 416.

Otherwise, if the communication endpoint 101 is not busy in step 406, the call log manager 122 determines if the call has been forked in step 406. If the call has been forked in step 406, the call log manager 122 conveys that the call has been forked to the communication endpoint 101 of the initial call request. The process then goes to step 416.

If the call was not forked in step 406 (or has flowed from steps 408, 410, 412, or 414) the call log manager 122 determines if there is an additional change of intent in step 416. If there is an additional change of intent in step 416, the process goes to step 306 to route the call based on the change of intent. Otherwise, if there is no additional change of intent for the call, the process goes to step 302.

To illustrate, consider the call for the call entry 210G displayed on the communication endpoint 101A. In this example, the call for the communication endpoint 101A was missed because the communication endpoint 101A was busy, which causes the process of FIG. 4 to flow through steps 400 (no), 402 (no), 404 (yes), and 412 where the status of the busy call is conveyed to the communication endpoint 101A via the call log 200. The call log manager 122 determines in step 416 that the call is to also be automatically forwarded. As a result, the process goes to step 306, where the communication processor 121 automatically forwards the call to Jane Doe. The call log manager 122 determines in step 400 that the call was automatically forwarded. The call log manager 122 conveys the call forward status in step 408, resulting in the call entry 210G being displayed in the call log 200 of the communication endpoint 101A. The call log manager 122 determines in step 416 that there are no additional changes of intent for the call and where the communication processor 121 waits to receive a call request in step 302.

The above process describes situations of where the initial intent of the call was changed. However, other events associated with the call may also be included in the call log 200. For example, transferring a call, conferencing on an additional party, dropping a party from a conference call, placing a call on hold, playing music on hold, placing a call in a contact center queue, and/or the like may be included in the call log 200.

FIG. 5 is a flow diagram of a process for conveying status to a call log 200 when a called party is not involved in a communication session. The process starts in step 500. The communication processor 121 waits in step 502 to receive a signal that a call request to establish a communication session with the communication endpoint 101A has been received. If a call request to establish the communication session has not been received in step 502, the process of step 502 is repeated.

Otherwise, if a call request is received in step 502, the communication processor 121 routes the call to the communication endpoint 101A in step 504. The communication processor 121 determines in step 506 if the call was answered in step 506. If the call was not answered in step 506, the process goes to step 512 where the call log 200 is updated for the missed call and then goes back to step 502.

If the call was answered in step 506, the call log manager 122 (and/or a module in the communication endpoint 101A) determines if a called party of the communication endpoint 101A is not involved in the communication session in step 508. The called party of the communication endpoint 101A can be determined in various ways. For example, the called party of the communication endpoint 101A may be administered. The call log manager 122 can determine that the called party was not involved in the communication session in various ways, such as, by voice recognition, by facial recognition, by an authentication process, and/or the like.

If the called party was involved in the communication session in step 508, the process goes to step 502. Otherwise, if the called party was not involved in the communication session in step 510, the call log manager 122 conveys the status of the missed call and optionally who was involved in the communication session to the communication endpoint 101A for display in the call log 200 of the communication endpoint 101A.

To illustrate, consider the example as described in call entry 210N. Shelly Black is the defined user of the communication endpoint 101A. The call from Bill Green was received at the communication endpoint 101A (step 502-504) and answered by Jim Bob (step 506). Jim Bob says that Shelly Black is not available and hangs up. The call log manager 122 determines that Shelly Black was not involved in the communication session in step 508 based on voice recognition of Jim Bob's voice, but not of Shelly Black's voice. Since Shelly Back is not involved in the communication session in step 508, the call log manager 122 conveys the status of the missed call from Bill Green that was answered by Jim Bob in step 512 as shown in call entry 210N.

The above process will also work where there are multiple defined users of a communication endpoint 101. For example, assume that users Fred Hayes and Bill Green share the communication endpoint 101 (a phone). If a call for Fred Hayes is answered by Bill Green and Fred Hays is not involved, the call log would reflect a missed call for Fred Hayes. The call log manager 122 can detect a missed call by analyzing communications in the communication session. For example, if the caller says "Is Fred Hayes there" and Bill Green responds "No, call back later," the call log would indicate that a call for Fred Hayes was missed and answered by Bill Green.

The above process will also work where the call is answered by a different person and then given to the called party. For example, if a call for Shelly Black was answered by Jim Bob and was eventually given to Shelly Black, the call log manager 122 would determine that Shelly Black was involved in the communication session in step 502 and not convey the missed call status.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A system for managing calls comprising:
   a microprocessor; and
   a computer readable medium, coupled with the microprocessor and comprising microprocessor readable and executable instructions that program the microprocessor to execute:
   a communication processor that receives a first call request to establish a first communication session from a first communication endpoint to a second communication endpoint and changes an intent of the first call request, wherein changing the intent of the first call request comprises:
   changing a first type of medium and/or a first type of resolution of the first type of medium of the first communication session to a second different type of medium and/or a second different type of resolution of the first communication session, wherein the first type of medium and the second different type of medium comprise one of voice, video, or Instant Messaging; and
   a call log manager that, conveys first status information regarding the changed intent of the first call request to the second communication endpoint in response to changing the intent of the first call request.

2. The system of claim 1, wherein changing the intent of the first call request results in the conveyed first status information being received at the second communication endpoint and the conveyed first status information being displayed in a call log on the second communication endpoint.

3. The system of claim 1, wherein the call processor receives a second call request to establish a second communication session from the first communication endpoint to the second communication endpoint and changes an intent of the second call request by automatically forwarding the second call request and conveys second status information that indicates the second call request was forwarded to a third communication endpoint.

4. The system of claim 3, wherein automatically forwarding the second call request results in the second call request being answered at the third communication endpoint and detection of a plurality of persons answering the second call request at the third communication endpoint, wherein the conveyed second status information also includes names of the plurality of persons answering the second call request at the third communication endpoint and a telephone number of the third communication endpoint.

5. The system of claim 1, wherein the call processor receives a second call request to establish a second communication session from the first communication endpoint to the second communication endpoint, changes an intent of the second call request by automatically forking the second call request, and conveys second status information that indicates the second call request was forked to a third communication endpoint.

6. The system of claim 1, wherein the call processor receives a second call request to establish a second communication session from the first communication endpoint to the second communication endpoint, changes an intent of the second call request by automatically rejecting the second call request based on a plurality of active call appearances on the second communication endpoint being busy, and conveys second status information that indicates the second call request was missed based on the second communication endpoint being busy.

7. The system of claim 6, wherein the conveyed second status information identifies individual users who were on calls for each of the plurality of active call appearances.

8. The system of claim 1, wherein the call processor receives a second call request to establish a second communication session from the first communication endpoint to the second communication endpoint, changes an intent of the second call request by automatically forwarding or automatically forking the second call request to a third communication endpoint, wherein the automatically forwarded or automatically forked second call request is directed to a fourth communication device, and conveys second status information that indicates the second call request was forwarded or forked to the third communication endpoint and directed to the fourth communication device.

9. A method for managing calls comprising:
   receiving, by a microprocessor, a first call request to establish a first communication session from a first communication endpoint to a second communication endpoint;
   changing, by the microprocessor, an intent of the first call request, wherein changing the intent of the first call request comprises:
   changing, by the microprocessor, a first type of medium and/or a first type of resolution of the first type of medium of the first communication session to a second different type of medium and/or a second different type of resolution of the first communication session, wherein the first type of medium and the second different type of medium comprise one of voice, video, or Instant Messaging; and
   in response to changing the intent of the first call request, conveying, by the microprocessor, first status information regarding changing the intent of the first call request to the second communication endpoint.

10. The method of claim 9, wherein changing the intent of the first call request results in the conveyed first status information being received at the second communication endpoint and the conveyed first status information being displayed in a call log on the second communication endpoint.

11. The method of claim 9, further comprising: receiving, by the microprocessor, a second call request to establish a second communication session from the first communication endpoint to the second communication endpoint, changing, by the microprocessor, an intent of the second call request by automatically forwarding the second call request, and conveying, by the microprocessor, second status information that indicates the second call request was forwarded to a third communication endpoint.

12. The method of claim 11, wherein automatically forwarding the second call request, results in the second call request being answered at the third communication endpoint and detection of a plurality of persons answering the second call request at the third communication endpoint, wherein the conveyed second status information also includes names of the plurality of persons answering the second call request at the third communication endpoint and a telephone number of the third communication endpoint.

13. The method of claim 9, further comprising: receiving, by the microprocessor, a second call request to establish a second communication session from the first communication endpoint to the second communication endpoint, changing, by the microprocessor, an intent of the second call request by automatically forking the second call request, and conveying, by the microprocessor, second status information that indicates the second call request was forked to a third communication endpoint.

14. The method of claim 9, further comprising: receiving, by the microprocessor, a second call request to establish a second communication session from the first communication endpoint to the second communication endpoint, changing, by the microprocessor, an intent of the second call request by automatically rejecting the second call request based on a plurality of active call appearances on the second communication endpoint being busy, and the conveying, by the microprocessor, second status information that indicates the second call request was missed based on the second communication endpoint being busy.

15. The method of claim 9, further comprising: receiving, by the microprocessor, a second call request to establish a second communication session from the first communication endpoint to the second communication endpoint, changing, by the microprocessor, an intent of the second call request by automatically forwarding or automatically forking the second call request to a third communication endpoint, wherein the automatically forwarded or automatically forked second call request is directed to a fourth communication device, and conveying, by the microprocessor, second status information indicating that the call was forwarded or forked to the third communication endpoint and directed to the fourth communication device.

16. A method for managing calls comprising:
receiving, by a microprocessor, a signal that a communication session has been answered at a communication endpoint of a called party;
determining, by the microprocessor, that the called party of the communication endpoint is not involved in the communication session at the communication endpoint of the called party; and
in response to determining that the called party is not involved in the communication session at the communication endpoint of the called party, rendering for display, by the microprocessor, in a call log on the communication endpoint of the called party that the communication session was missed by the called party.

17. The method of claim 16, wherein communication endpoint of the called party has a plurality of defined users and wherein determining that the called party is not involved in the communication session is based on analyzing a conversation of the communication session at the communication endpoint of the called party.

18. The system of claim 1, wherein changing the first type of medium and/or the first type of resolution of the first type of medium of the first communication session to the second different type of medium and/or the second different type of resolution of the first communication session comprises changing the first type of medium to the second type different of medium.

19. The system of claim 1, wherein changing the first type of medium and/or the first type of resolution of the first type of medium of the first communication session to the second different type of medium and/or the second different type of resolution of the first communication session comprises changing the first type of resolution to the second type different of resolution.

20. The system of claim 8, wherein the conveyed second status information is conveyed as the second communication session progresses from, being automatically forwarded or forked to the third communication endpoint to being directed to the fourth communication endpoint.

* * * * *